United States Patent
Malik et al.

(10) Patent No.: US 11,972,145 B2
(45) Date of Patent: Apr. 30, 2024

(54) OPPORTUNISTIC DATA MOVEMENT

(71) Applicant: Micron Technology, Inc., Boise, ID (US)

(72) Inventors: Saira Samar Malik, Lafayette, IN (US); Chinnakrishnan Ballapuram, San Jose, CA (US); Taeksang Song, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 134 days.

(21) Appl. No.: 17/570,024

(22) Filed: Jan. 6, 2022

(65) Prior Publication Data

US 2022/0229600 A1    Jul. 21, 2022

Related U.S. Application Data

(60) Provisional application No. 63/140,101, filed on Jan. 21, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/0611; G06F 3/0613; G06F 3/0656; G06F 3/0655; G06F 12/0868; G06F 12/0893; G06F 2212/22
See application file for complete search history.

(56) References Cited

U.S. PATENT DOCUMENTS

| | | | | |
|---|---|---|---|---|
| 10,991,417 | B1* | 4/2021 | Arbel | G06F 13/1673 |
| 2003/0065891 | A1* | 4/2003 | Sato | G06F 12/0215 |
| | | | | 711/E12.04 |
| 2005/0204093 | A1* | 9/2005 | Rotithor | G06F 13/1673 |
| | | | | 711/158 |
| 2009/0097346 | A1* | 4/2009 | Rao | G11C 11/4096 |
| | | | | 365/203 |
| 2013/0138892 | A1* | 5/2013 | Loh | G06F 12/123 |
| | | | | 711/134 |

(Continued)

OTHER PUBLICATIONS

Shin, W., Choi, J., Jang, J., Suh, J., Kwon, Y., Moon, Y., Kim, H. and Kim, L.S., 2015. Q-DRAM: Quick-access DRAM with decoupled restoring from row-activation. IEEE Transactions on Computers, 65(7), pp. 2213-2227.*

*Primary Examiner* — Tracy A Warren
(74) *Attorney, Agent, or Firm* — Holland & Hart LLP

(57) ABSTRACT

Methods, systems, and devices for opportunistic data movement are described. A memory device may include a non-volatile memory and a volatile memory that operates as a cache for the non-volatile memory. The memory device may receive a write command from a host device. The write command may be associated with a row of a bank in a volatile memory. The memory device may write data associated with the write command to a buffer that is associated with the bank and that is coupled with the volatile memory. And the memory device may communicate the data from the buffer to the volatile memory based on the write command and before a pre-charge command for the row of the bank is received from the host device.

24 Claims, 8 Drawing Sheets

(56) References Cited

U.S. PATENT DOCUMENTS

| | | | |
|---|---|---|---|
| 2013/0238856 A1* | 9/2013 | Loh | G06F 12/0882 |
| | | | 711/E12.017 |
| 2014/0068203 A1* | 3/2014 | Son | G06F 3/068 |
| | | | 711/155 |
| 2017/0315920 A1* | 11/2017 | Andre | G06F 3/0683 |
| 2018/0032435 A1* | 2/2018 | Parker | G06F 12/0833 |
| 2018/0336150 A1* | 11/2018 | Jinn | G06F 13/26 |
| 2019/0384718 A1* | 12/2019 | Hansson | G11C 7/1063 |

* cited by examiner

OPPORTUNISTIC DATA MOVEMENT

CROSS REFERENCE

The present application for patent claims priority to U.S. Provisional Patent Application No. 63/140,101 by Malik et al., entitled "OPPORTUNISTIC DATA MOVEMENT", filed Jan. 21, 2021, which is assigned to the assignee hereof, and is expressly incorporated by reference in its entirety herein.

FIELD OF TECHNOLOGY

The following relates generally to one or more systems for memory and more specifically to opportunistic data movement.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may include a non-volatile memory (e.g., a primary memory for storing information among other operations) and a volatile memory that operates as a cache for the non-volatile memory. Such a configuration may allow the device to benefit from advantages of the non-volatile memory (e.g., non-volatility and persistent storage, high storage capacity, low power consumption) while maintaining compatibility with a host device through the volatile memory. If such a device receives one or more write commands for data associated with a row of a bank in the volatile memory, the device may temporarily store the data for the row in a buffer. Upon receipt of a command, such as a pre-charge command, for the row, the device may communicate data for the row from the buffer to the volatile memory for storage. But waiting for the command, such as the pre-charge command, before communicating data to the volatile memory may delay closure of the row, which in turn may delay satisfaction of one or more subsequent access commands to that bank, among other disadvantages. Similar issues or others may arise if the device uses a second buffer to evict data from the volatile memory to the non-volatile memory.

According to the techniques described herein, a device may reduce the delay between receipt of a command, such as a pre-charge command, for a row and closure of the row by opportunistically communicating dirty data from, for example, the buffer to the volatile memory before the command, such as the pre-charge command, is received. Thus, the device may reduce the latency associated with accessing the row's bank relative to other techniques. According to the techniques described herein, a technique may be used for evicting data from, for example, a second buffer, to the non-volatile memory. For example, the device may communicate data from the second buffer to the non-volatile memory before a command, such as a pre-charge command, associated with the data is received.

Features of the disclosure are initially described in the context of a system and a memory subsystem as described with reference to FIGS. 1 and 2. Features of the disclosure are described in the context of a device, as described with reference to FIG. 3, and process flows, as described with reference to FIGS. 4 and 5. These and other features of the disclosure are further illustrated by and described with reference to an apparatus diagram and flowcharts that relate to opportunistic data movement as described with reference to FIGS. 6-8.

Figure 1:
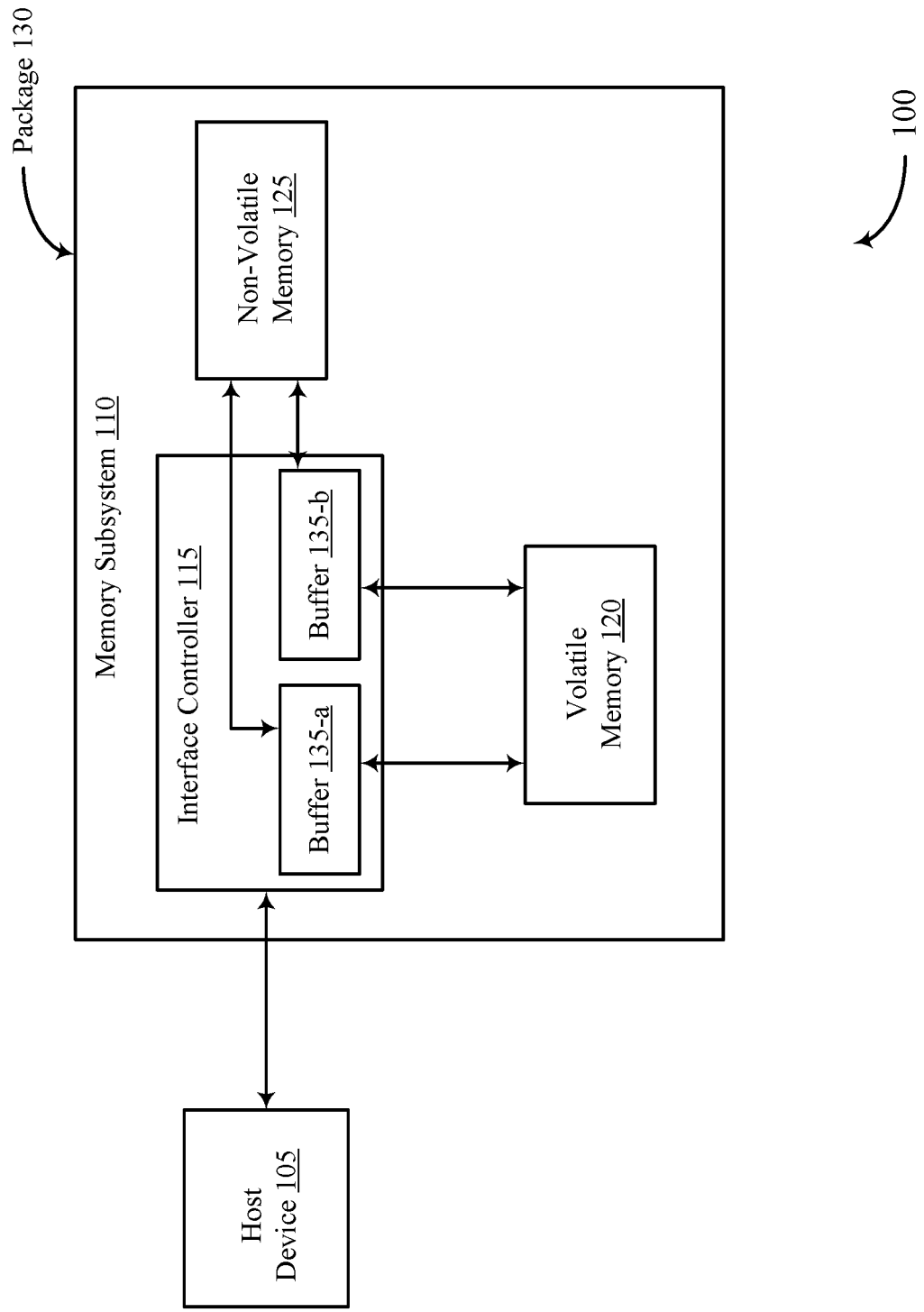
FIG. 1 illustrates an example of a system that supports opportunistic data movement in accordance with examples as disclosed herein.

FIG. 1 illustrates an example of a system 100 that supports opportunistic data movement in accordance with examples as disclosed herein. The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120 (with the data being transferred to the non-volatile memory 125 during a later eviction process).

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data, as described in FIGS. 4 and 5) so that it can be transmitted to the host device 105.

In general, the term "hit" may be used to refer to the scenario where the volatile memory 120 stores data targeted by the host device 105 (e.g., in a read scenario) or data associated with a non-volatile memory address targeted by the host device (e.g., in a write scenario). In general, the term "miss" may be used to refer to the scenario where the volatile memory 120 does not store data targeted by the host device 105 (e.g., in a read scenario) or data associated with a non-volatile memory address targeted by the host device (e.g., in a write scenario).

Figure 4:
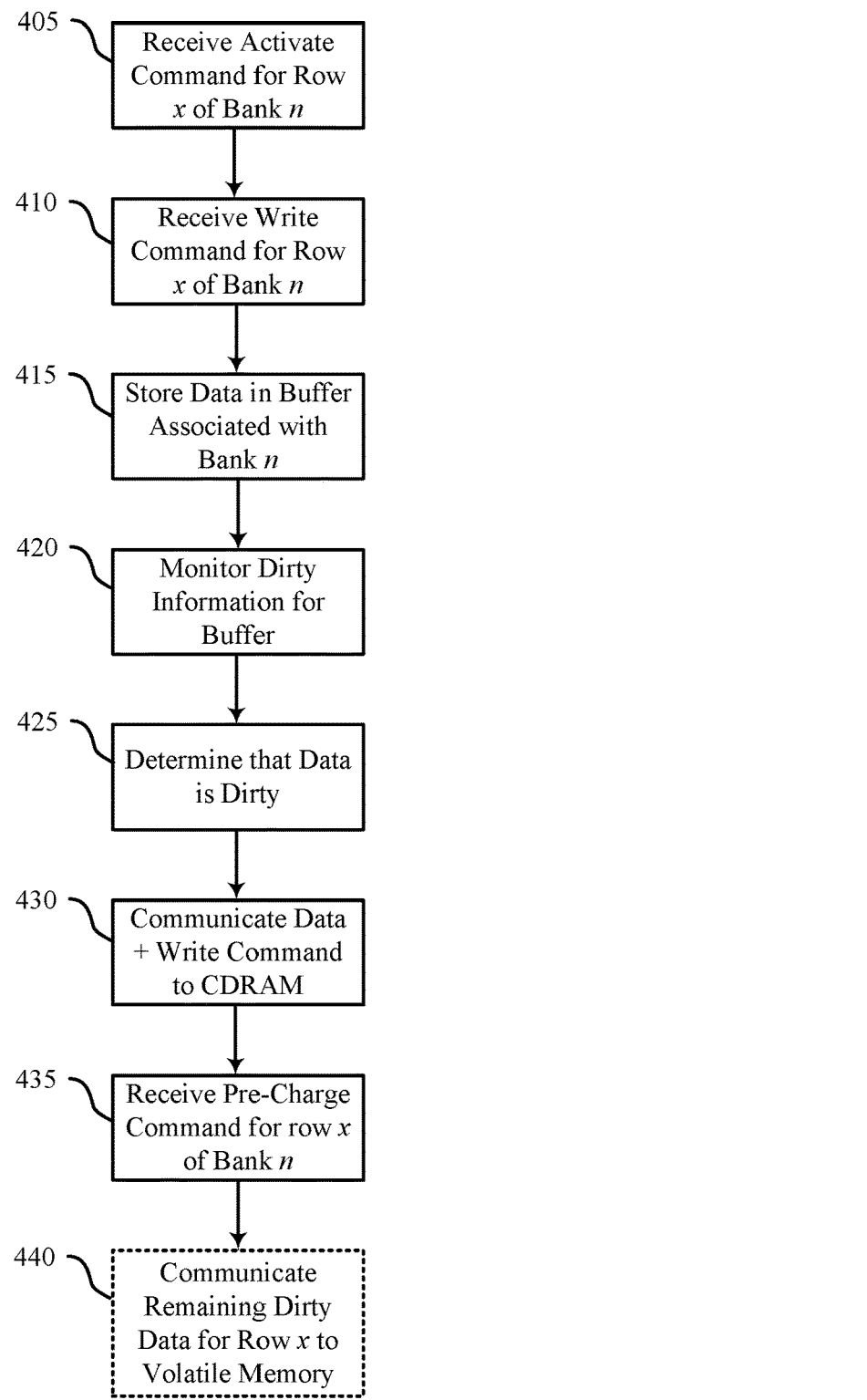
FIG. 4 illustrates an example of a process flow that supports opportunistic data movement in accordance with examples as disclosed herein.
Figure 5:
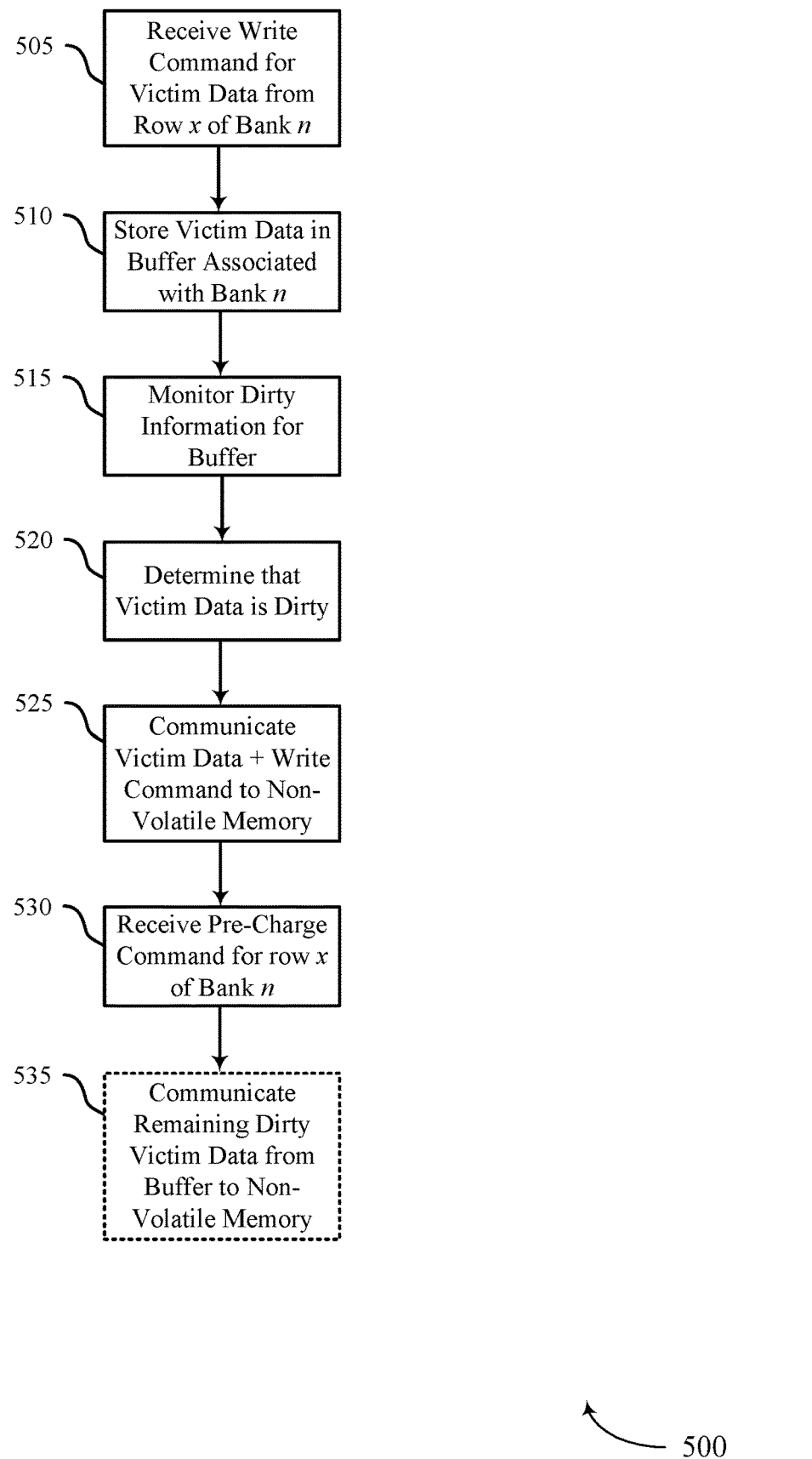
FIG. 5 illustrates an example of a process flow that supports opportunistic data movement in accordance with examples as disclosed herein.

Continuing the foregoing example, if the n sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that then sets of volatile memory cells do not store the requested data, as described with reference to FIGS. 4 and 5) so that it can be transmitted to the host device 105.

In a read miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But then sets of volatile memory cells may already be storing data for other sets of non-volatile memory cells. So, to preserve this other data, the interface controller 115 may transfer the other data to the buffer 135-b so that it can be transferred to the non-volatile memory 125 for storage. Such a process may be referred to as "eviction" and the data transferred from the volatile memory 120 to the buffer 135-b may be referred to as "victim" data.

In some cases, the interface controller 115 may transfer a subset of the victim data from the buffer 135-b to the non-volatile memory 125. For example, the interface controller 115 may transfer one or more subsets of victim data that have changed since the data was initially stored in the non-volatile memory 125. Data that is associated with the same memory address but is inconsistent between one memory and another memory (e.g., due to an update in one memory and not the other) may be referred to in some cases as "modified" or "dirty" data. In some examples (e.g., if interface controller operates in one mode such as a write-back mode), dirty data may be data that is present in one memory but not present in the other. In some examples, data in the volatile memory 120 may be dirty data if it is inconsistent with corresponding data in the non-volatile memory 125, or if corresponding data is absent from the non-volatile memory 125. As another example, data in the buffer 218 may be dirty data if it is inconsistent with corresponding data in the volatile memory 120, or if corresponding data is absent from the volatile memory 120. Corresponding data may refer to data associated with the same memory address (e.g., volatile memory address, non-volatile memory address) as the other data.

Thus, the buffers 135 may be used to temporarily store data for communication between the host device 105, the volatile memory 120, and the non-volatile memory 125. As an example, data to be written to a row of a bank in the volatile memory 120 may be accumulated in the buffer 135-a. The data accumulated in the buffer 135-a may be received in 32 B or 64 B chunks (or at other levels of granularity) from the host device 105, along with associated write commands. Upon receipt of a preceding activate command for the row, the interface controller 115 may activate or "open" the row to prepare the row for an access procedure. However, the interface controller 115 may not begin moving the data (e.g., valid, dirty data) from the buffer 135-a to the volatile memory 120 until a subsequent pre-charge command is received for the row. If the volatile memory 120 follows a closed-page policy in which one row in a bank must be closed before another row can be opened, waiting for the pre-charge command before moving data to the volatile memory 120 may effectively "block" that bank from further access until all the relevant data has been stored in the row and the row has been closed. Thus, the volatile memory 120 may violate access timing expected by the host device 105 or increase the latency associated with servicing access commands from the host device 105, among other issues.

According to the techniques described herein, the interface controller 115 may opportunistically or strategically move data for a row of the volatile memory 120 from the buffer 135-a to the volatile memory 120 before a pre-charge command for the row is received, thereby reducing the latency between receipt of the pre-charge command and closure of the row. Such a technique may be referred to as opportunistic write-back.

During an eviction procedure for a row of the volatile memory 120, data to be stored in non-volatile memory 125 (e.g., victim data from the row) may be accumulated in the buffer 135-b. The victim data accumulated in the buffer 135-b may be received from the volatile memory 120 along with associated write commands. Upon receipt of a pre-charge command for the row of the bank, the buffer 135-b may move dirty victim data from the buffer 135-b to the non-volatile memory 125 for storage. If the buffer 135-b is the only eviction buffer dedicated to the bank of the volatile memory 120, a subsequent eviction procedure for the bank may be stalled until the buffer 135-b finishes moving dirty victim data to the non-volatile memory 125. Thus, access to the bank of the volatile memory 120 may be effectively blocked until all the dirty victim data has been moved to the non-volatile memory 125 (and the buffer 135-b is available for the next eviction procedure).

According to the techniques described herein, the interface controller 115 may opportunistically or strategically move dirty victim data from the buffer 135-b to the non-volatile memory 125. Specifically, data that originates from a row in the volatile memory 120 may be moved from the buffer 135-b to the non-volatile memory 125 before a pre-charge command for the row is received by the interface controller 115. Such a technique may be referred to as opportunistic eviction and may allow the buffer 135-b to empty sooner relative to other techniques. Thus, the accessibility of the volatile memory 120, which depends on the efficiency of eviction procedures, may be improved. Although described with reference to a scenario in which a single buffer is used per bank of the volatile memory, the opportunistic eviction technique may provide similar benefits in a scenario in which a dynamic pool of eviction buffers is used for the volatile memory 120.

Although described separately, in some examples the buffer 135-a and the buffer 135-b may be combined. That is, the functionality of the buffers 135-a and the buffers 135-b may be provided by a single buffer.

Figure 2:
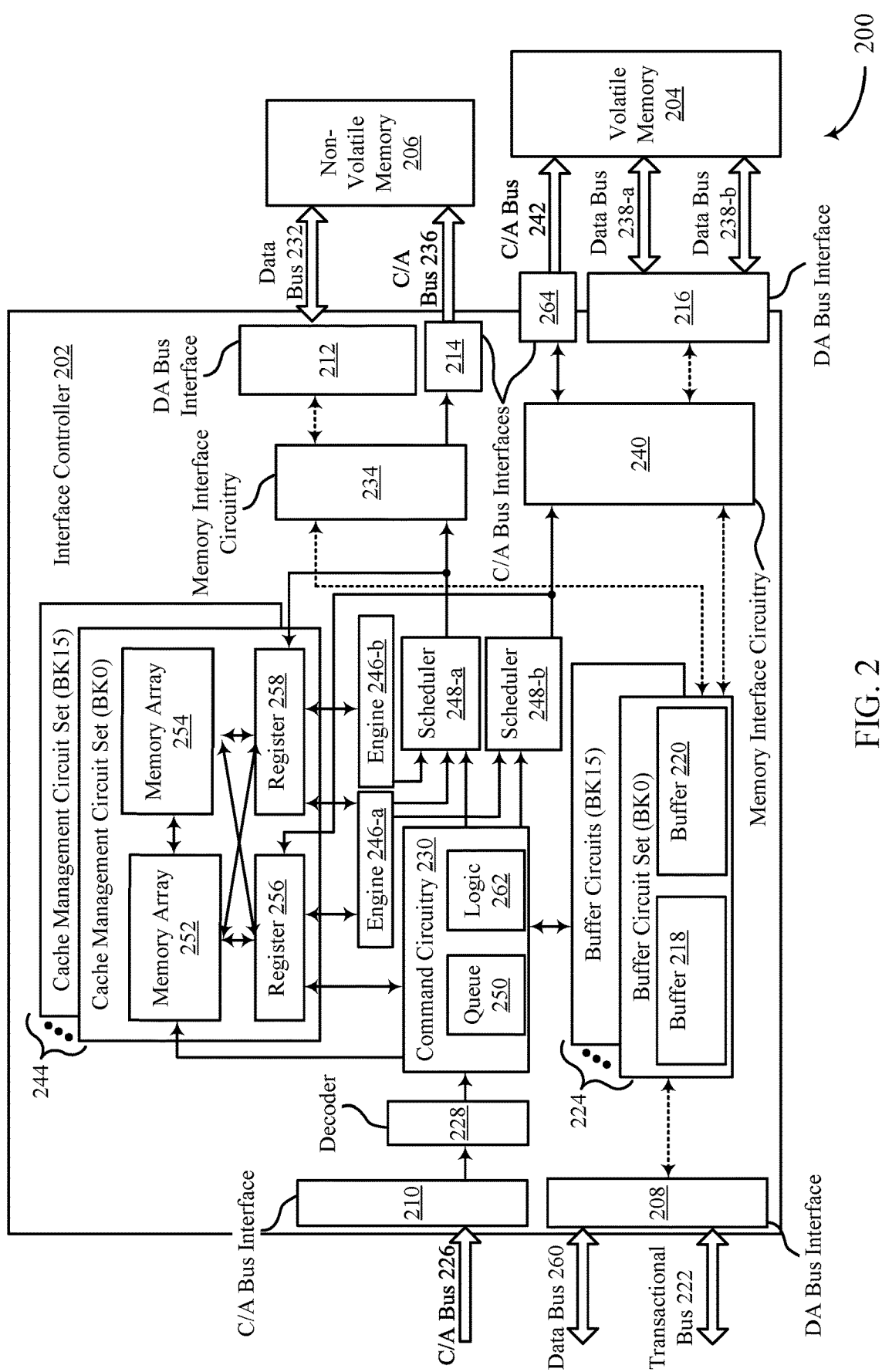
FIG. 2 illustrates an example of a memory subsystem that supports opportunistic data movement in accordance with examples as disclosed herein.

FIG. 2 illustrates an example of a memory subsystem 200 that supports opportunistic data movement in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces or the amount of data a row is capable of storing. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated if an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide power and efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row (and thus, the amount of data a row is capable of storing). As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 (e.g., data bus 238-a, data bus 238-b) and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 262 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a write command or read command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a Cache DRAM Tag Array (CDT-TA)) and a memory array 254 (e.g., a cache DRAM Valid (CDT-V) array), which may be configured to store storage information for BK0. The memory arrays may also be referred to as arrays or buffers in some examples. In some cases, the memory arrays may be or include volatile memory cells, such as static RAM (SRAM) cells.

Storage information (or "metadata") may include content information, validity information, dirty information (or any combination thereof) associated with the volatile memory 204, among other examples. Content information (which may also be referred to as tag information or address information) may indicate which data is stored in a set of volatile memory cells. For example, the content information (e.g., a tag address) for a row of the volatile memory 204 may indicate which set of one or more non-volatile memory cells currently has data stored in the row. As noted, validity information may indicate whether the data stored in a set of volatile memory cells is actual data (e.g., data having an intended order or form) or placeholder data (e.g., data being random or dummy, not having an intended or important order). And dirty information may indicate whether data in one memory is dirty relative to corresponding data in another memory. For example, dirty information for the volatile memory 204 may indicate whether the data stored in a set of one or more volatile memory cells of the volatile memory 204 is dirty (e.g., has been updated, is different than) relative to corresponding data stored in a set of one or more non-volatile memory cells of the non-volatile memory 206. As another example, dirty information for the buffer 218 may indicate whether data stored in the buffer 218 is dirty (e.g., has been updated, is different than) relative to corresponding data stored in the volatile memory 204.

In some examples, the memory subsystem 200 may also maintain dirty information for data in the buffers 218. The dirty information for a buffer 218 may indicate the dirty status of data in the buffer 218 relative to corresponding data in the bank associated with that buffer 218.

The memory array 252 may include memory cells that store storage information (e.g., tag information, validity information, dirty information) for an associated bank (e.g., BK0) of the volatile memory 204. The storage information may be stored on a per-row basis (e.g., there may be respective storage information for each row of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set (e.g., row) of volatile memory cells if actual data is stored in that set of volatile memory cells. This bit may be referred to a validity bit or a validity flag. As with the content information, the validity information stored in the memory array 252 may be stored on a per-row basis. Thus, each validity bit may indicate the validity of data stored in an associated row in some examples.

In some examples, the memory array 252 may store dirty information that indicates whether a set (e.g., row) of volatile memory cells stores any dirty data. Like the validity information, the dirty information stored in the memory array 252 may be stored on a per-row basis.

The memory array 254 may be similar to the memory array 252 and may also include memory cells that store storage information for a bank (e.g., BK0) of the volatile memory 204 that is associated with the memory array 252. For example, the memory array 254 may store validity information and dirty information for a bank of the volatile memory 204. However, the storage information stored in the memory array 254 may be stored on a sub-block basis as opposed to a per-row basis. For example, the validity information stored in the memory cells of the memory array 254 may indicate the validity of data for subsets of volatile memory cells in a row of the volatile memory 204.

As an example, the validity information in the memory array 254 may indicate the validity of each subset (e.g., 32 B or 64 B) of data stored in row of BK0 of the volatile memory 204. Similarly, the dirty information stored in the memory cells of the memory array 254 may indicate which subsets of volatile memory cells in a row of the volatile memory 204 store dirty data. For instance, the dirty information in the memory array 254 may indicate the dirty status of each subset (e.g., 32 B or 64 B) of data stored in row of BK0 of the volatile memory 204. Storing storage information (e.g., tag information, validity information) on a per-row basis in the memory array 252 may allow the interface controller 202 to determine whether there is a hit or miss for data in the volatile memory 204. Storing storage information (e.g., validity information, dirty information) on a sub-block basis in the memory array 254 may allow the interface controller 202 to determine which subsets of data to return to the host device (e.g., during a retrieval process) and which subsets of data to preserve in the non-volatile memory 206 (e.g., during an eviction process).

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-b or both. The cache management circuitry set may also include a second register (e.g., a register 258 which may be a victim page tag (VPT) register) configured to receive storage information (e.g., validity information, dirty information) from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on storage information in the register 256, the register 258, or both.

The engine 246-a may be coupled with the register 256, the register 258, and the schedulers 248. The engine 246-a may be configured to receive storage information from various components and issue commands to the schedulers 248 based on the storage information. For example, if the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, if the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64 B) of the set of data in the buffer 220 should be transferred to the non-volatile memory 206.

The scheduler 248-*a* may be coupled with various components of the interface controller 202 and may facilitate accessing the non-volatile memory 206 by issuing commands to the memory interface circuitry 234. The commands issued by the scheduler 248-*a* may be based on commands from the command circuitry 230, the engine 246-*a*, the engine 246-*b*, or a combination of these components. Similarly, the scheduler 248-*b* may be coupled with various components of the interface controller 202 and may facilitate accessing the volatile memory 204 by issuing commands to the memory interface circuitry 240. The commands issued by the scheduler 248-*b* may be based on commands from the command circuitry 230 or the engine 246-*a*, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204.

In either mode, the interface controller 202 may first check to see if the volatile memory 204 has memory cells available to store the data. To do so, the command circuitry 230 may reference the memory array 252 (e.g., using a set of the memory address bits) to determine whether one or more of then sets (e.g., row) of volatile memory cells associated with the memory address are empty (e.g., store random or invalid data). For example, the command circuitry 230 may determine whether one or more of the n sets (e.g., rows) of volatile memory cells is available based on tag information and validity information stored in the memory array 252. In some cases, a set of volatile memory cells in the volatile memory 204 may be referred to as a line, cache line, or row.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the victim data from one of the n associated sets of volatile memory cells to the buffer 220. The dirty information for the victim data may be transferred from the memory array 254 to the register 258 for identification of dirty subsets of the victim data. After the victim data is stored in the buffer 220, the new data can be transferred from the buffer 218 to the volatile memory 204 and the victim data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-*b* based on dirty information transferred from the memory array 254 to the register 258 during the eviction process.

In another example, the interface controller 202 may receive a retrieval command from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of then sets (e.g., rows) of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of then associated sets of volatile memory cells is available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

In some examples, a register 256 may be configured so that an engine 246-a can monitor, such as continuously monitor, dirty information for an associated buffer 218. The dirty information may reflect the dirty status of data stored in the buffer 218 relative to data in the bank associated with the buffer 218. Data in the buffer 218 may be considered dirty if it is different than corresponding data in the associated bank, or if the bank has no corresponding data. In some examples, a register 256 may be configured so that an engine 246-a can monitor, such as continuously monitor, validity information for an associated buffer 218. The validity information may reflect the validity status of data stored in the buffer 218 relative to a row of a bank associated with the buffer. Data in the buffer 218 may be considered valid if it is associated with the open row in the associated bank, whereas data in the buffer 218 may be considered invalid if it is random data or data from a different row than the open row.

In some examples, a register 258 may be configured so that an engine 246-b can monitor, such as continuously monitor, dirty information for an associated buffer 220. The dirty information may reflect the dirty status of data stored in the buffer 220 relative to corresponding data in the non-volatile memory 206. Data in the buffer 220 may be considered dirty if it is different than corresponding data in the non-volatile memory 206, or if the non-volatile memory 206 has no corresponding data. In some examples, a register 258 may be configured so that an engine 246-b can monitor, such as continuously monitor, validity information for an associated buffer 220. The validity information may reflect the validity status of data stored in the buffer 220. Data in the buffer 220 may be considered valid if it is associated with the row undergoing a current eviction procedure, whereas data in the buffer 220 may be considered invalid if it is random data or data from a row other than the row undergoing the eviction procedure.

It should be appreciated that the volatile memory 204 and the non-volatile memory 206 may support various policies for accessing memory cells. For example, the volatile memory 204 and the non-volatile memory 206 may comply with an activation policy that requires the volatile memory 204 and non-volatile memory 206 to open (or "activate") a row before reading data from, or writing data to, the row. Additionally, the volatile memory 204 and the non-volatile memory 206 may comply with a closed page policy that requires one row of a bank in the volatile memory 204 or non-volatile memory 206 to be closed (or "deactivated") before another row in the same bank is activated.

As noted, a buffer 218 may be used to accumulate data for (e.g., to be written to) or from a row of an associated bank in the volatile memory 204. For example, in a write scenario, the buffer 218 may accumulate data from the host device that is to be written to a row of the associated bank in the volatile memory 204. The interface controller 202 may then communicate the data from the buffer 218 to the volatile memory 204. It should be appreciated that some or all of the data in the buffer 218 may be communicated to the volatile memory 204 depending on the validity and dirty status of the data. For example, the interface controller 202 may communicate valid, dirty data for a row from the buffer 218 to the associated bank in the volatile memory 204. As described herein, the interface controller 202 may implement opportunistic write-back by communicating valid, dirty data from the buffer 218 to the volatile memory 204 before a pre-charge command for the row is received from the host device. Because the interface controller 202 communicates data to the volatile memory 204 in small chunks (e.g., 64 B) at a time (e.g., due to the cache-line size of the volatile memory 204), starting the write-back procedure early may allow the interface controller 202 to complete the write-back procedure early (compared to other techniques).

In some examples (e.g., in the event of a read miss or write miss), the interface controller 202 may evict data from a row of the volatile memory 204 before writing new data to the row. A buffer 218 may be used to accumulate victim data evicted from a row of an associated bank in the volatile memory 204. Upon receipt of a pre-charge command for the row from the host device, the interface controller 202 may begin to communicate data from the buffer 218 to the volatile memory 204. It should be appreciated that some or all of the data in the buffer 218 may be communicated to the volatile memory 204 depending on the validity and dirty status of the data. For example, the interface controller 202 may communicate valid, dirty data for a row from the buffer 218 to the associated bank in the volatile memory 204. As described herein, the interface controller 202 may implement opportunistic write-back by communicating valid, dirty data from the buffer 218 to the volatile memory 204 before a pre-charge command for the row is received from the host device. Because data is communicated to the volatile memory 204 in small chunks (e.g., 32 B) at a time, starting the eviction procedure early may allow the interface controller 202 to complete the eviction procedure early (compared to other techniques).

Figure 3:
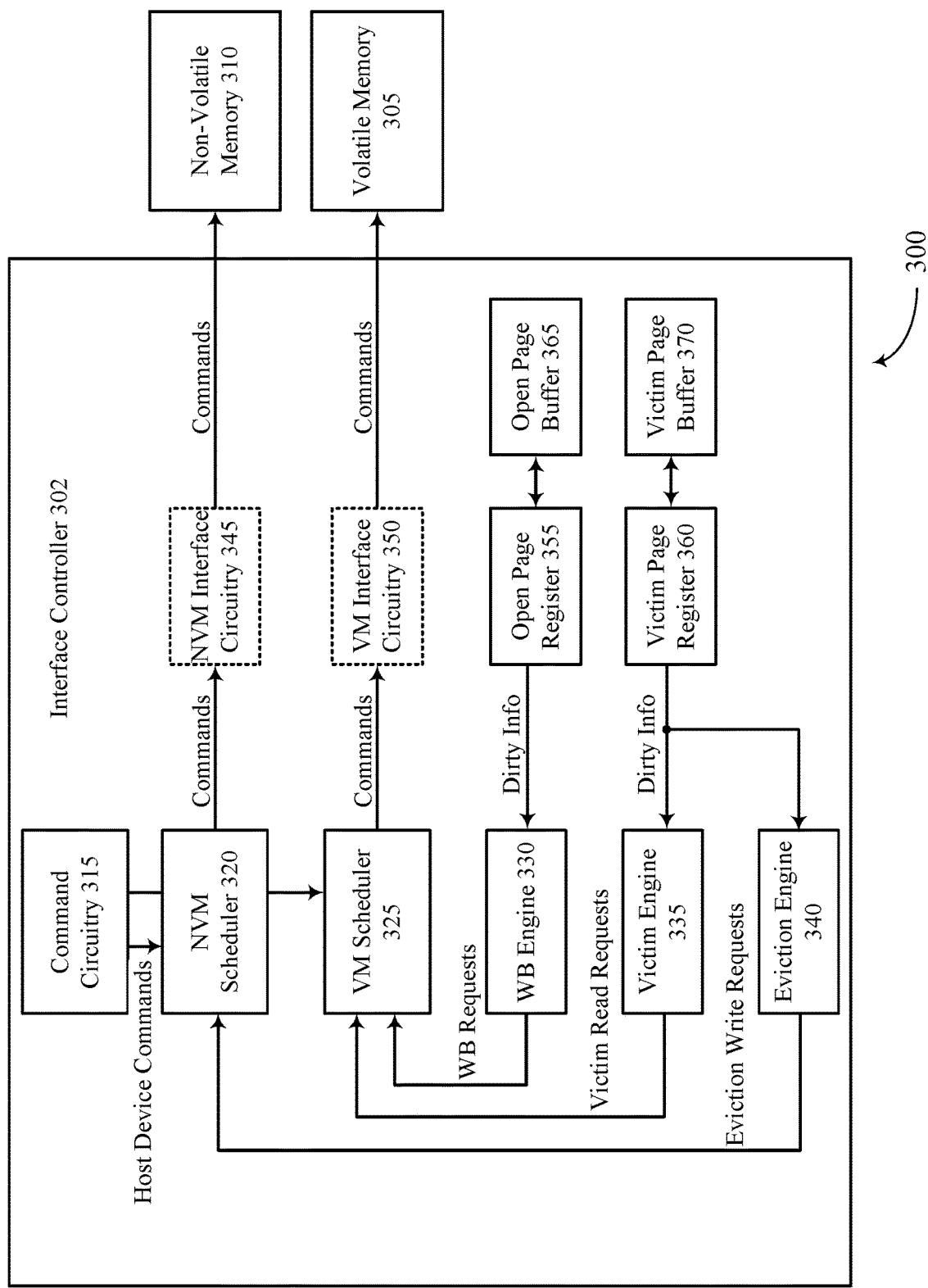
FIG. 3 illustrates an example of a device that supports opportunistic data movement in accordance with examples as disclosed herein.

FIG. 3 illustrates an example of a device 300 that supports opportunistic data movement in accordance with examples as disclosed herein. The device 300 may be, or include, aspects of the memory subsystem 110, as described with reference to FIG. 1, or the memory subsystem 200, as described with reference to FIG. 2. Or the device may be any type of device that includes multiple memories. The device 300 may perform opportunistic write-back procedures and opportunistic eviction procedures, which may improve the operation of the device 300 relative to other types of write-back and eviction procedures.

Although shown with limited connections for ease of illustration, additional connections between various components of the device 300 are contemplated. For example, the buffers 365, 370 may be coupled with the volatile memory 305 and the non-volatile memory 310 so that data can be communicated between the buffers 365, 370 and the memories. Further, additional components may be included and are contemplated. For example, the volatile memory 305 may include multiple (e.g., x) banks, and per bank there may be one write-back engine 330, one victim engine 335, one eviction engine 340, one open page register 355, one victim page register 360, one open page buffer 365, and one victim page buffer 370 (for a total of x components for each listed component, where x is the quantity of banks in the volatile memory 305). However, for ease of illustration the techniques disclosed herein are described with reference to a single instance of each listed component. Although described separately, in some examples the buffers 365, 370 may be combined. That is, the functionality of the buffers 365, 370 may be provided by a single buffer in some examples.

The device 300 may implement an opportunistic write-back procedure by operating the open page buffer 365, the open page register 355, the write-back (WB) engine 330, the volatile memory (VM) scheduler 325, and the volatile memory interface circuitry 350, among other components, as described herein. Referring back to FIG. 2, the open page buffer 365 may be an example of the buffer 218, the open page register 355 may be an example of the register 256, the write-back engine 330 may be an example of engine 246-*a*, the volatile memory scheduler 325 may be an example of the scheduler 248-*b*, and the volatile memory interface circuitry 350 may be an example of memory interface circuitry 240.

The open page register 355 may be configured to reflect, for example continuously reflect, the validity status and dirty status of data in the open page buffer 365. For example, the open page register 355 may include a number of flip-flop circuits that output flags indicative of the validity status and dirty status for each 64 B (or other granularity) of data in the open page buffer 365. The flags output by the flip-flop circuits may be updated in real time as the validity and dirty statuses of data in the open page buffer 365 change. Thus, the open page register 355 may be configured to provide, for example, continuously provide (or make available, or transfer) dirty information and validity information to the write-back engine 330. As noted, the data in the open page buffer 365 may include data for an open row of a bank in the volatile memory 305. In some examples, the open page buffer 365 may also include data from a previously open row of the bank.

If stored in the open page buffer 365, data for an open row of the volatile memory 305 may be considered valid data whereas data for a previously open (but now closed) row of the volatile memory may be considered invalid. If stored in the open page buffer 365, data for a row of the volatile memory 305 may be considered dirty data if the data is different than corresponding data in the volatile memory 305 (or if corresponding data is absent from the volatile memory 305).

The write-back engine 330 may monitor the validity information and dirty information inside the open page register 355 and communicate write-back requests to the volatile memory scheduler 325 (e.g., based on the validity information and the dirty information) along with relevant storage information. A write-back request may indicate dirty data that is to be communicated from the open page buffer 365 to the volatile memory 305 as well as the volatile memory address associated with the dirty data so that the data can be stored in the correct location. Relevant storage information may include one or more dirty information flags, the total quantity of dirty data in the open page buffer 365, or both. A write-back request may also be referred to as a write-back command and may be considered an access command from the perspective of the volatile memory scheduler.

The volatile memory scheduler 325 may accumulate access commands for the volatile memory (referred to as VM access commands) and determine the order and timing of issuance for those access commands. The volatile memory scheduler 325 may receive and arbitrate between VM access commands that originate from a host device and access commands that originate internally (e.g., from other components of the interface controller 302). For example, the volatile memory scheduler 325 may arbitrate between access commands for satisfying a write-back request from the write-back engine and access commands for satisfying host device requests. Host device requests may be received from the command circuitry 315, which may sort between VM access commands and NVM access commands. In addition to arbitrating between access commands, the volatile memory scheduler 325 may control the direction of a data bus between the interface controller 302 and the volatile memory 305. The direction of the data bus, or data bus "mode" may refer to the in-bound or out-bound flow of data from the perspective of the interface controller 302.

If arbitrating between VM access commands, the volatile memory scheduler 325 may consider the data bus direction as a factor. For example, the volatile memory scheduler may issue write commands if the data bus is operating in a write direction (e.g., configured for data transmission) and may issue read commands if the data bus is operating in a read direction (e.g., configured for reception). The volatile memory scheduler 325 may use a turnaround policy to determine when to switch the direction of the data bus. The turnaround policy may be based on a variety of factors such as the quantity of queued write commands for the volatile memory 305, the quantity of queued read commands for the volatile memory 305, the priority levels of access commands, the readiness of a bank for an activate command, or a combination of these metrics. Because the issuance of an access command is based on the direction of the data bus, a factor of the turnaround policy may be considered a factor for issuing an access command.

Upon receipt of a write-back request from the write-back engine, the volatile memory scheduler 325 may add one or more access commands for satisfying the write-back request to one or more queues. For example, based on a write-back request the volatile memory scheduler 325 may add a write command for the open row of the volatile memory 305 to a write command queue. The volatile memory scheduler 325 may also maintain a read command queue. As noted, the volatile memory scheduler 325 may determine a direction of the data bus based on the quantity of write commands in the write queue and read commands in the read queue. Thus, the issuance of a write command for the write-back procedure may be based on the quantity of write commands in the write queue and read commands in the read queue. The volatile memory scheduler 325 may issue the write command for the row of the volatile memory if the data bus is operating in the write direction. The order of issuance of the write command relative to other queued write commands may be based on order of receipt, the relative priorities of the write commands, or both, among other metrics. According to the opportunistic write-back techniques described herein, the volatile memory scheduler 325 may issue the write command for the write-back procedure before the interface controller 302 receives a pre-charge command for the open row.

Access commands issued by the volatile memory scheduler 325 may be received by the volatile memory interface circuitry 350 and relayed to the volatile memory 305. The volatile memory interface circuitry 350 may be responsible for timing the relay of access commands to the volatile memory 305 (e.g., so that the access commands are issued with appropriate timing for the volatile memory 305). Thus, the interface controller 302 may implement an opportunistic write-back procedure.

The device 300 may implement an opportunistic eviction procedure by operating the victim page buffer 370, the victim page register 360, the victim engine 335, the eviction engine 340, the non-volatile memory (NVM) scheduler 320, and the non-volatile memory interface circuitry 345, among other components, as described herein. Referring back to FIG. 2, the victim page buffer 370 may be an example of the buffer 220, the victim page register 360 may be an example of the register 256, the victim engine 335 and the eviction engine 340 may be an examples of an engine 246-b functionally split into two components, the non-volatile memory scheduler 320 may be an example of the scheduler 248-a, and the volatile memory interface circuitry 350 may be an example of memory interface circuitry 234.

The victim page register 360 may be configured to reflect, for example continuously reflect, the validity status and dirty status of data in the victim page buffer 370. For example, the victim page register 360 may include a number of flip-flop circuits that output flags indicative of the validity status and dirty status for each 64 B (or other granularity) of data in the victim page buffer 370. The flags output by the flip-flop circuits may be updated in real time as the validity and dirty statuses of data in the victim page buffer 370 change. Thus, the victim page register 360 may be configured to provide, such as continuously provide, (or make available, or transfer) dirty information and validity information to the victim engine 335 and the eviction engine 340. As noted, the data in the victim page buffer 370 may include data from a victim row of a bank in the volatile memory 305. In some examples, the victim page buffer 370 may also include data from a previously victimized row of the bank.

If stored in the victim page buffer 370, data from the current victim row of the volatile memory 305 may be considered valid data whereas data from a previously victimized row of the volatile memory 305 may be considered invalid. If stored in the victim page buffer 370, data from the current victim row of the volatile memory 305 may be considered dirty data if the data is different than corresponding data in the non-volatile memory 310 (or if corresponding data is absent from the non-volatile memory 310).

The victim engine 335 may monitor the validity information and dirty information inside the victim page register 360 and communicate victimization requests (e.g., based on the validity information and the dirty information) to the volatile memory scheduler 325 along with relevant storage information. A victimization request may indicate data that is to be communicated from the volatile memory 305 to the victim page buffer 370 as part of an eviction process, as well as the non-volatile memory address associated with the data so that the data can be stored in the correct location of the non-volatile memory 310. A victimization request may also be referred to as a victimization command and may be considered an access command from the perspective of the volatile memory scheduler 325. The volatile memory scheduler 325 may add access commands (e.g., one or more read commands for the victim row of the volatile memory 305) associated with the victimization request to the appropriate queues and arbitrate between the access commands and other access commands as described herein.

The eviction engine 340 may monitor the validity information and dirty information inside the victim page register 360 and communicate eviction requests (e.g., based on the validity information and dirty information) to the non-volatile memory scheduler 320 along with relevant storage information. An eviction request may indicate dirty victim data that is to be communicated from the victim page buffer 370 to the non-volatile memory 310 as well as the non-volatile memory address associated with the dirty victim data so that the dirty victim data can be stored in the correct location. Relevant storage information may include one or more dirty information flags, the total quantity of dirty data in the victim page buffer 370, or both. An eviction request may also be referred to as an eviction command and may be considered an access command from the perspective of the non-volatile memory scheduler 320.

The non-volatile memory scheduler 320 may accumulate access commands for the non-volatile memory (referred to as NVM access commands) and determine the order and timing of issuance for those access commands. The non-volatile memory scheduler 320 may receive and arbitrate between NVM access commands that originate from a host device and access commands that originate internally (e.g., from other components of the interface controller 302). For example, the non-volatile memory scheduler 320 may arbitrate between access commands for satisfying an eviction request from the eviction engine 340 and access commands for satisfying host device requests. Host device requests may be received from the command circuitry 315, which may sort between VM access commands and NVM access commands. In addition to arbitrating between NVM access commands, the non-volatile memory scheduler 320 may control the direction of a data bus between the interface controller 302 and the non-volatile memory 310.

If arbitrating between NVM access commands, the non-volatile memory scheduler 320 may consider the data bus direction as a factor. For example, the non-volatile memory scheduler 320 may issue write commands if the data bus is operating in a write direction and may issue read commands if the data bus is operating in a read direction. The non-volatile memory scheduler 320 may use a turnaround policy to determine when to switch the direction of the data bus. The turnaround policy may be based on a variety of factors such as the quantity of queued write commands for the non-volatile memory 310, the quantity of queued read commands for the non-volatile memory 310, the priority levels of access commands, the readiness of a bank for an activate command, or a combination of these metrics.

Upon receipt of an eviction request from the eviction engine 340, the non-volatile memory scheduler 320 may add one or more access commands for satisfying the eviction request to one or more queues. For example, based on an eviction request the non-volatile memory scheduler 320 may add to a write command queue a write command for a row of the non-volatile memory 310 associated with data in the victim page buffer 370. The non-volatile memory scheduler 320 may also maintain a read command queue. As noted, the non-volatile memory scheduler 320 may determine a direction of the data bus based on the quantity of write commands in the write queue and read commands in the read queue. Thus, the issuance of a write command for the eviction procedure may be based on the quantity of write commands in the write queue and read commands in the read queue. The non-volatile memory scheduler 320 may issue the write command for the row of the non-volatile memory 310 if the data bus is operating in the write direction. The order of issuance of the write command relative to other queued write commands may be based on order of receipt, the relative priorities of the write commands, or both, among other metrics. According to the opportunistic eviction techniques described herein, the non-volatile memory scheduler 320 may issue the write command for the eviction procedure before the interface controller 302 receives a pre-charge command for the victim row of the volatile memory 305.

Access commands issued by the non-volatile memory scheduler 320 may be received by the non-volatile memory interface circuitry 345 and relayed to the non-volatile memory 310. The non-volatile memory interface circuitry 345 may be responsible for timing the relay of access commands to the non-volatile memory 310 (e.g., so that the access commands are issued with appropriate timing for the non-volatile memory 310).

Thus, the interface controller 302 may implement an opportunistic eviction procedure.

FIG. 4 illustrates an example of a process flow 400 that supports opportunistic data movement in accordance with examples as disclosed herein. Process flow 400 may be implemented by a memory subsystem 110 or interface controller 115 as described with reference to FIG. 1, a memory subsystem 200 or interface controller 202 as described with reference to FIG. 2, a device 300 or interface controller 302 as described with reference to FIG. 3, or another type of device. The process flow 400 may illustrate the operations of a device during an opportunistic write-back procedure.

For ease of reference, the process flow 400 is described with reference to a device. For example, aspects of the process flow 400 may be implemented by a device that includes a volatile memory that is operated as a cache for a non-volatile memory. Additionally or alternatively, aspects of the process flow 400 may be implemented as instructions stored in memory (e.g., firmware stored in the volatile memory 120 or the non-volatile memory 125). For example, the instructions, when executed by a controller, may cause the controller to perform the operations of the process flow 400.

At 405, an activate command may be received, for example, from a host device. For example, the interface controller 302 may receive an activate command for row x of bank n. The activate command may indicate that row x is to be activated (e.g., energized, opened). In response to the activate command, the interface controller 302 may open row x of bank n. At 410, a write command may be received from the host device. For example, the interface controller 302 may receive a write command for row x of bank n. The write command may be associated with data received from the host device.

At 415, in response to the write command, the data associated with the write command may be stored, for example, in a buffer. For example, the interface controller 302 may write the data to a buffer (e.g., an open page buffer 365) associated with bank n. At 420, dirty information for the buffer may be monitored. For example, the write-back engine 330 may monitor dirty flags for the buffer maintained by the open page register 355. At 425, it may be determined that the data is dirty data. For example, the write-back engine 330 may determine that the data is dirty data based on the dirty flag (e.g., dirty bit) associated with the data.

At 430, the data may be communicated, for example, from the buffer to, for example, the volatile memory and an associated write command may be communicated, for example, to the volatile memory. For example, the interface controller 302 may communicate the data from the buffer to the volatile memory 305 and the interface controller 302 may communicate an associated write command for the data to the volatile memory 305. The write command may be issued from the volatile memory scheduler 325 (e.g., in response to a write-back request from the write-back engine) and may be relayed to the volatile memory 305 via the volatile memory interface circuitry 350. The volatile memory scheduler 325 may issue the write command based on the quantity of write commands queued for the volatile memory 305, the quantity of read commands queued for the volatile memory 305, the priority of the write command, an availability of a bank for an activate command, or a combination of these metrics. Upon receipt of the data and the associated write command, the volatile memory 305 may write the data to row x of bank n. The interface controller 302 may continue to opportunistically move dirty data from the buffer to the volatile memory until a pre-charge command for the row is received.

At 435, a command, such as a pre-charge command, may be received, for example, from the host device. For example, the interface controller 302 may receive a pre-charge command for row x of bank n. At 440, any remaining dirty data in the buffer may be communicated to the volatile memory for storage in row x of bank n. The remaining dirty data may be communicated based on the pre-charge command. Upon receipt of the remaining dirty data, the volatile memory 305 may write the remaining dirty data to row x of bank n and close row x. The volatile memory 305 may close row x based on a pre-charge command received by the volatile memory after receipt of the remaining data.

Thus, an opportunistic write-back procedure may be implemented. Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

FIG. 5 illustrates an example of a process flow 500 that supports opportunistic data movement in accordance with examples as disclosed herein. Process flow 500 may be implemented by a memory subsystem 110 or interface controller 115 as described with reference to FIG. 1, a memory subsystem 200 or interface controller 202 as described with reference to FIG. 2, a device 300 or interface controller 302 as described with reference to FIG. 3, or another type of device. The process flow 500 may illustrate the operations of a device during an opportunistic eviction procedure. In some examples, aspects of process flow 500 may occur in parallel or overlap partially in time with aspects of process flow 400. For example, aspects of process flow 500 may be performed as part of an eviction procedure that is initiated in response to the activate command received in process flow 400.

For ease of reference, the process flow 500 is described with reference to a device. For example, aspects of the process flow 500 may be implemented by a device that includes a volatile memory that is operated as a cache for a non-volatile memory. Additionally or alternatively, aspects of the process flow 500 may be implemented as instructions stored in memory (e.g., firmware stored in the volatile memory 120 or the non-volatile memory 125). For example, the instructions, when executed by a controller, may cause the controller to perform the operations of the process flow 500.

At 505, a write command may be received for data from a row of the volatile memory. For example, a controller for the victim page buffer 370 may receive a write command for victim data from row x of bank n. At 510, in response to the write command, the victim data associated with the write command may be stored in a buffer associated with bank n. For example, the interface controller 302 may write the victim data to a buffer (e.g., a victim page buffer 370) associated with bank n. At 515, dirty information for the buffer may be monitored. For example, the eviction engine 340 may monitor dirty flags for the buffer maintained by the victim page register 360. At 520, it may be determined that the victim data is dirty victim data. For example, the eviction engine 340 may determine that the victim data is dirty victim data based on the dirty flag (e.g., dirty bit) associated with the victim data.

At 525, the dirty victim data may be communicated from the buffer to the non-volatile memory and an associated write command may be communicated to the non-volatile memory. For example, the interface controller 302 may communicate the dirty victim data from the victim page buffer 370 to the non-volatile memory 310 and the interface controller 302 may communicate an associated write command for the dirty victim data to the non-volatile memory 310. The write command may be issued from the non-volatile memory scheduler 320 (e.g., in response to an eviction request from the eviction engine 340) and may be relayed to the non-volatile memory 310 via the non-volatile memory interface circuitry 345. The non-volatile memory scheduler 320 may issue the write command based on the quantity of write commands queued for the non-volatile memory 310, the quantity of read commands queued for the non-volatile memory 310, the priority of the write command, an availability of a bank in the non-volatile memory 310 for an activate command, or a combination of these metrics. Upon receipt of the data and the associated write command, the non-volatile memory 310 may write the victim data from row x of bank n to the non-volatile memory 310. The interface controller 302 may continue to opportunistically move dirty victim data from the buffer to the non-volatile memory until a pre-charge command for the row is received.

At 530, a pre-charge command may be received from the host device. For example, the interface controller 302 may receive a pre-charge command for row x of bank n. At 535, any remaining dirty victim data in the buffer may be communicated to the non-volatile memory 310 for storage. The remaining dirty victim data may be communicated based on the pre-charge command. Upon receipt of the remaining dirty victim data, the non-volatile memory 310 may write the remaining dirty victim data to the non-volatile memory 310. Once the remaining dirty victim data is communicated to the non-volatile memory 310, the buffer may be available for a new eviction procedure. The new eviction procedure may be from the same bank (e.g., bank n, if a single buffer per bank is used) or from a different bank (e.g., if a dynamic pool of buffers is used).

Thus, an opportunistic eviction procedure may be implemented. Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 6:
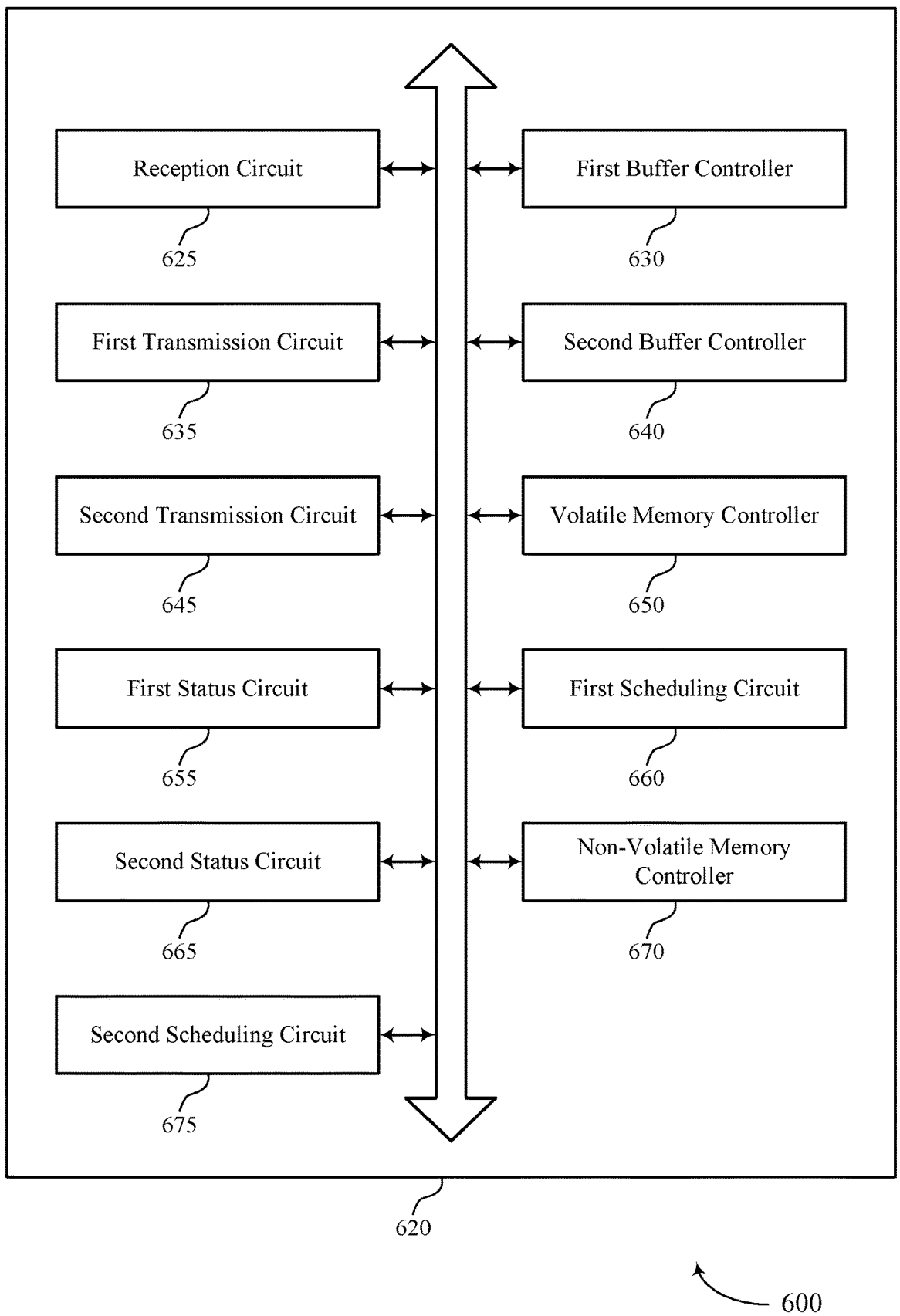
FIG. 6 shows a block diagram of a memory device that supports opportunistic data movement in accordance with examples as disclosed herein.

FIG. 6 shows a block diagram 600 of a memory device 620 that supports opportunistic data movement in accordance with examples as disclosed herein. The memory device 620 may be an example of aspects of a memory device as described with reference to FIGS. 1 through 5. The memory device 620, or various components thereof, may be an example of means for performing various aspects of opportunistic data movement as described herein. For example, the memory device 620 may include a reception circuit 625, a first buffer controller 630, a first transmission circuit 635, a second buffer controller 640, a second transmission circuit 645, a volatile memory controller 650, a first status circuit 655, a first scheduling circuit 660, a non-volatile memory controller 670, a second status circuit 665, a second scheduling circuit 675, or any combination thereof. Each of these components may communicate, directly or indirectly, with one another (e.g., via one or more buses).

The reception circuit 625 may be or include a data bus, a data bus interface, logic, circuitry, a processor, a controller, or other components capable of performing the functions described herein. The first buffer controller 630 may be or include logic, circuitry, a processor, a controller, or other components capable of performing the functions described herein. The first buffer controller 630 may control the operations of the open page buffer 365. The first transmission circuit 635 may be or include a data bus, a data bus interface, logic, circuitry, a processor, a controller, or other components capable of performing the functions described herein. The second buffer controller 640 may be or include logic, circuitry, a processor, a controller, or other components capable of performing the functions described herein. The second buffer controller 640 may control the operations of the victim page buffer 370. The second transmission circuit 645 may be or include a data bus, a data bus interface, logic, circuitry, a processor, a controller, or other components capable of performing the functions described herein. The volatile memory controller 650 may be or include logic, circuitry, a processor, a controller, or other components capable of performing the functions described herein.

The first status circuit 655 may be or include logic, circuitry, a processor, a controller, or other components capable of performing the functions described herein. The first status circuit 655 may be an example of write-back engine 330. The first scheduling circuit 660 may be or include logic, circuitry, a processor, a controller, or other components capable of performing the functions described herein. The first scheduling circuit 660 may be an example of the volatile memory scheduler 325. The second status circuit 665 may be or include logic, circuitry, a processor, a controller, or other components capable of performing the functions described herein. The second status circuit 665 may be an example of the eviction engine 340. The non-volatile memory controller 670 may be or include logic, circuitry, a processor, a controller, or other components capable of performing the functions described herein. The second scheduling circuit 675 may be or include logic, circuitry, a processor, a controller, or other components capable of performing the functions described herein. The second scheduling circuit 675 may be an example of the non-volatile memory scheduler 320.

The reception circuit 625 may be configured as or otherwise support a means for receiving, from a host device, a write command associated with a row of a bank in a volatile memory, the volatile memory configured to operate as a cache for a non-volatile memory. The first buffer controller 630 may be configured as or otherwise support a means for writing data associated with the write command to a buffer that is associated with the bank and that is coupled with the volatile memory. The first transmission circuit 635 may be configured as or otherwise support a means for communicating the data from the buffer to the volatile memory based at least in part on the write command and before a pre-charge command for the row of the bank is received from the host device.

In some examples, the volatile memory controller 650 may be configured as or otherwise support a means for writing the data to the row of the bank in the volatile memory based at least in part on the write command and after communicating the data to the volatile memory.

In some examples, the first status circuit 655 may be configured as or otherwise support a means for determining the data includes dirty data that is different than corresponding data in the row, where the data is communicated from the buffer to the volatile memory based at least in part on the data including dirty data.

In some examples, the first status circuit 655 may be configured as or otherwise support a means for monitoring dirty information for the buffer, the dirty information in a register associated with the buffer, where the data is communicated based at least in part on the dirty information indicating the data includes dirty data.

In some examples, the first scheduling circuit 660 may be configured as or otherwise support a means for determining a first quantity of queued write commands for the volatile memory and a second quantity of queued read commands for the volatile memory, where the data is communicated based at least in part on the first quantity of queued write commands and the second quantity of queued read commands.

In some examples, the first buffer controller 630 may be configured as or otherwise support a means for writing second data for the row to the buffer based at least in part on a second write command. In some examples, the first transmission circuit 635 may be configured as or otherwise support a means for communicating, based at least in part on the second write command and before the pre-charge command is received for the row of the bank, the second data from the buffer to the volatile memory.

In some examples, the first buffer controller 630 may be configured as or otherwise support a means for writing second data for the row to the buffer based at least in part on a second write command. In some examples, the reception circuit 625 may be configured as or otherwise support a means for receiving, from the host device, the pre-charge command for the row of the bank. In some examples, the first transmission circuit 635 may be configured as or otherwise support a means for communicating the second data from the buffer to the volatile memory based at least in part on the second write command and the pre-charge command.

In some examples, the first buffer controller 630 may be configured as or otherwise support a means for determining, based at least in part on the write command, the row of the bank is storing second data. In some examples, the second buffer controller 640 may be configured as or otherwise support a means for storing, based at least in part on the determination, the second data in a second buffer coupled with the volatile memory and the non-volatile memory. In some examples, the second transmission circuit 645 may be configured as or otherwise support a means for communicating the second data to the non-volatile memory before the pre-charge command for the bank is received.

The second buffer controller 640 may be configured as or otherwise support a means for receiving a write command for data from a row of a bank in a volatile memory, the volatile memory configured to operate as a cache for a non-volatile memory. In some examples, the second buffer controller 640 may be configured as or otherwise support a means for writing, based at least in part on the write command, the data from the row of the bank to a buffer coupled with the volatile memory and the non-volatile memory. The second transmission circuit 645 may be configured as or otherwise support a means for communicating the data from the buffer to the non-volatile memory based at least in part on the write command and before a pre-charge command for the row of the bank is received from a host device.

In some examples, the non-volatile memory controller 670 may be configured as or otherwise support a means for writing the data to the non-volatile memory based at least in part on the write command and after communicating the data to the volatile memory.

In some examples, the write command is associated with an eviction procedure for saving the data from the row of the bank in the volatile memory to the non-volatile memory.

In some examples, the second status circuit 665 may be configured as or otherwise support a means for determining the data includes dirty data that is different than corresponding data in the non-volatile memory, where the data is communicated from the buffer to the non-volatile memory based at least in part on the data including dirty data.

In some examples, the second status circuit 665 may be configured as or otherwise support a means for monitoring dirty information for the buffer provided by a register associated with the buffer, where the data is communicated based at least in part on the dirty information indicating the data includes dirty data.

In some examples, the second scheduling circuit 675 may be configured as or otherwise support a means for determining a first quantity of queued write commands for the non-volatile memory and a second quantity of queued read commands for the non-volatile memory, where the data is communicated based at least in part on the first quantity of queued write commands and the second quantity of queued read commands.

In some examples, the second buffer controller 640 may be configured as or otherwise support a means for writing second data for the row to the buffer based at least in part on a second write command. In some examples, the reception circuit 625 may be configured as or otherwise support a means for receiving, from the host device, the pre-charge command for the row of the bank. In some examples, the second transmission circuit 645 may be configured as or otherwise support a means for communicating the second data from the buffer to the non-volatile memory based at least in part on the second write command and the pre-charge command.

In some examples, the second buffer controller 640 may be configured as or otherwise support a means for writing second data for the row to the buffer based at least in part on a second write command. In some examples, the second transmission circuit 645 may be configured as or otherwise support a means for communicating, based at least in part on the second write command and after the pre-charge command is received for the row of the bank, the second data from the buffer to the non-volatile memory.

Figure 7:
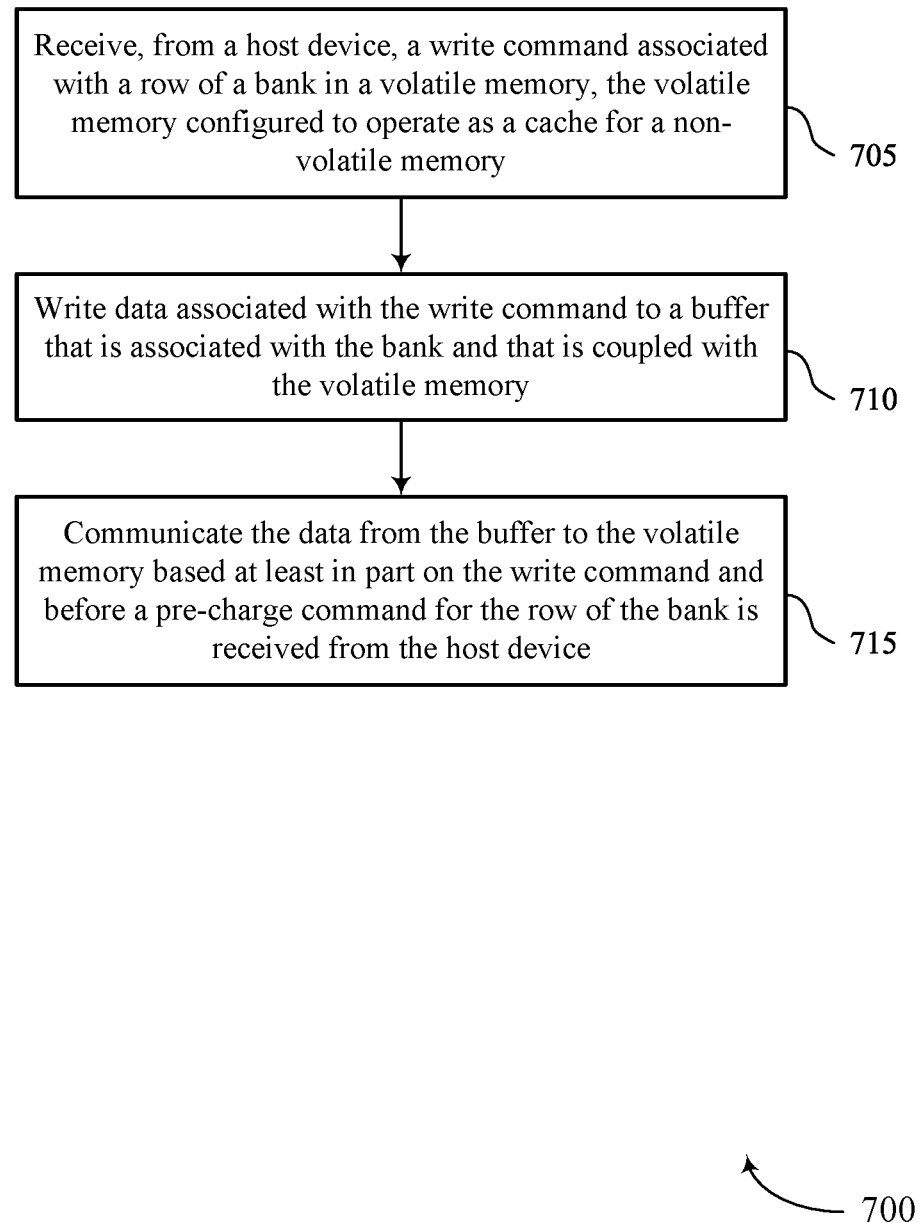
FIGS. 7 and 8 show flowcharts illustrating a method or methods that support opportunistic data movement in accordance with examples as disclosed herein.

FIG. 7 shows a flowchart illustrating a method 700 that supports opportunistic data movement in accordance with examples as disclosed herein. The operations of method 700 may be implemented by a memory device or its components as described herein. For example, the operations of method 700 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 705, the method may include receiving, from a host device, a write command associated with a row of a bank in a volatile memory, the volatile memory configured to operate as a cache for a non-volatile memory. The operations of 705 may be performed in accordance with examples as disclosed herein. In some examples, aspects of the operations of 705 may be performed by a reception circuit 625 as described with reference to FIG. 6.

At 710, the method may include writing data associated with the write command to a buffer that is associated with the bank and that is coupled with the volatile memory. The operations of 710 may be performed in accordance with examples as disclosed herein. In some examples, aspects of the operations of 710 may be performed by a first buffer controller 630 as described with reference to FIG. 6.

At 715, the method may include communicating the data from the buffer to the volatile memory based at least in part on (e.g., in response to) the write command and before a pre-charge command for the row of the bank is received from the host device. The operations of 715 may be performed in accordance with examples as disclosed herein. In some examples, aspects of the operations of 715 may be performed by a first transmission circuit 635 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, from a host device, a write command associated with a row of a bank in a volatile memory, the volatile memory configured to operate as a cache for a non-volatile memory, writing data associated with the write command to a buffer that is associated with the bank and that is coupled with the volatile memory, and communicating the data from the buffer to the volatile memory based at least in part on (e.g., in response to) the write command and before a pre-charge command for the row of the bank is received from the host device.

Some examples of the method 700 and the apparatus described herein may further include operations, features, circuitry, logic, means, or instructions for writing the data to the row of the bank in the volatile memory based at least in part on (e.g., in response to) the write command and after communicating the data to the volatile memory.

Some examples of the method 700 and the apparatus described herein may further include operations, features, circuitry, logic, means, or instructions for determining the data includes dirty data that may be different than corresponding data in the row, where the data may be communicated from the buffer to the volatile memory based at least in part on the data including dirty data.

Some examples of the method 700 and the apparatus described herein may further include operations, features, circuitry, logic, means, or instructions for monitoring dirty information for the buffer, the dirty information in a register associated with the buffer, where the data may be communicated based at least in part on the dirty information indicating the data includes dirty data.

Some examples of the method 700 and the apparatus described herein may further include operations, features, circuitry, logic, means, or instructions for determining a first quantity of queued write commands for the volatile memory and a second quantity of queued read commands for the volatile memory, where the data may be communicated based at least in part on the first quantity of queued write commands and the second quantity of queued read commands.

Some examples of the method 700 and the apparatus described herein may further include operations, features, circuitry, logic, means, or instructions for writing second data for the row to the buffer based at least in part on a second write command and communicating, based at least in part on (e.g., in response to, because of) the second write command and before the pre-charge command may be received for the row of the bank, the second data from the buffer to the volatile memory.

Some examples of the method 700 and the apparatus described herein may further include operations, features, circuitry, logic, means, or instructions for writing second data for the row to the buffer based at least in part on a second write command, receiving, from the host device, the pre-charge command for the row of the bank, and communicating the second data from the buffer to the volatile memory based at least in part on the second write command and the pre-charge command.

Some examples of the method 700 and the apparatus described herein may further include operations, features, circuitry, logic, means, or instructions for determining, based at least in part on the write command, the row of the bank may be storing second data, storing, based at least in part on the determination, the second data in a second buffer coupled with the volatile memory and the non-volatile memory, and communicating the second data to the non-volatile memory before the pre-charge command for the bank may be received.

Figure 8:
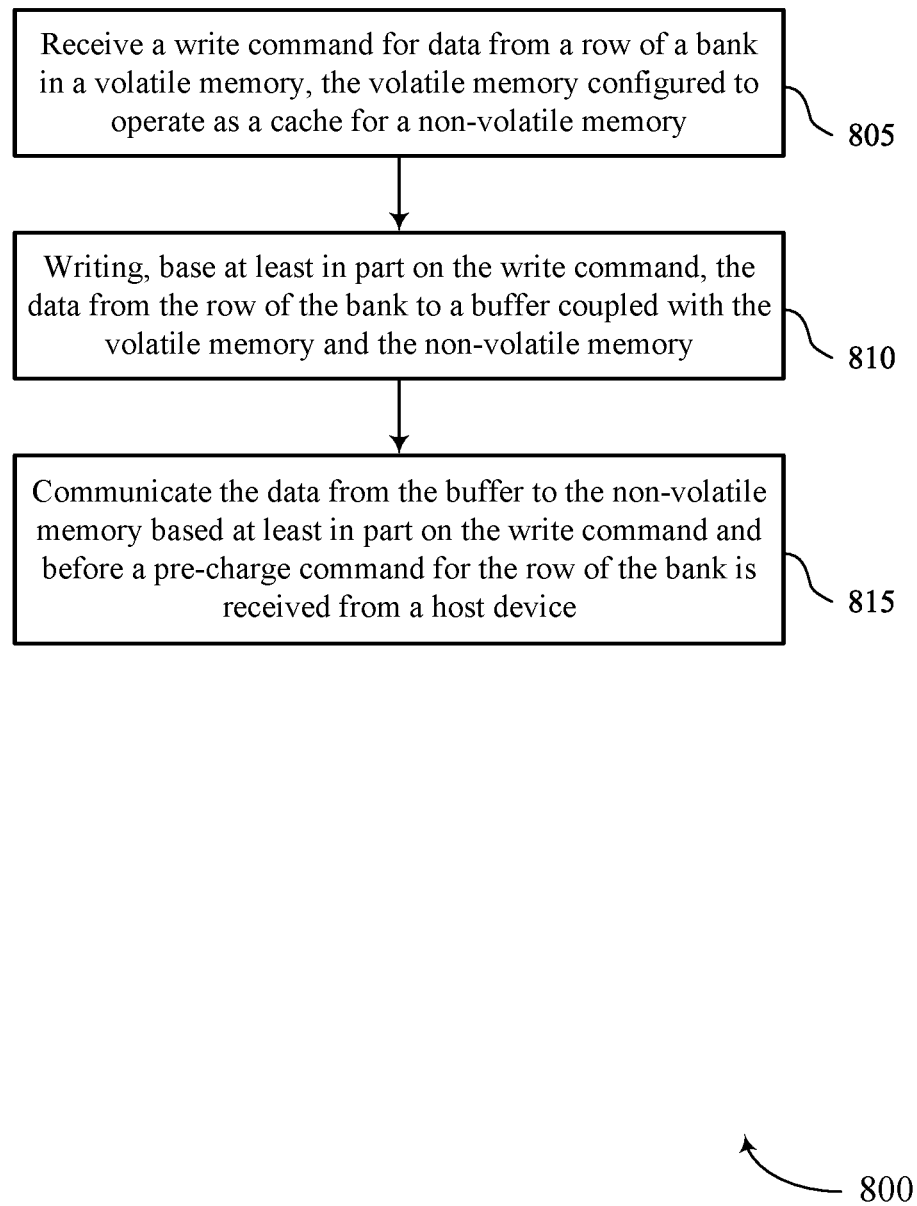

FIG. 8 shows a flowchart illustrating a method 800 that supports opportunistic data movement in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 805, the method may include receiving a write command for data from a row of a bank in a volatile memory, the volatile memory configured to operate as a cache for a non-volatile memory. The operations of 805 may be performed in accordance with examples as disclosed herein. In some examples, aspects of the operations of 805 may be performed by a second buffer controller 640 as described with reference to FIG. 6.

At 810, the method may include writing, based at least in part on (e.g., in response to) the write command, the data from the row of the bank to a buffer coupled with the volatile memory and the non-volatile memory. The operations of 810 may be performed in accordance with examples as disclosed herein. In some examples, aspects of the operations of 810 may be performed by a second buffer controller 640 as described with reference to FIG. 6.

At 815, the method may include communicating the data from the buffer to the non-volatile memory based at least in part on (e.g., in response to) the write command and before a pre-charge command for the row of the bank is received from a host device. The operations of 815 may be performed in accordance with examples as disclosed herein. In some examples, aspects of the operations of 815 may be performed by a second transmission circuit 645 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving a write command for data from a row of a bank in a volatile memory, the volatile memory configured to operate as a cache for a non-volatile memory, writing, based at least in part on the write command, the data from the row of the bank to a buffer coupled with the volatile memory and the non-volatile memory, and communicating the data from the buffer to the non-volatile memory based at least in part on the write command and before a pre-charge command for the row of the bank is received from a host device.

Some examples of the method 800 and the apparatus described herein may further include operations, features, circuitry, logic, means, or instructions for writing the data to the non-volatile memory based at least in part on the write command and after communicating the data to the volatile memory.

In some examples of the method 800 and the apparatus described herein, the write command may be associated with an eviction procedure for saving the data from the row of the bank in the volatile memory to the non-volatile memory.

Some examples of the method 800 and the apparatus described herein may further include operations, features, circuitry, logic, means, or instructions for determining the data includes dirty data that may be different than corresponding data in the non-volatile memory, where the data may be communicated from the buffer to the non-volatile memory based at least in part on the data including dirty data.

Some examples of the method 800 and the apparatus described herein may further include operations, features, circuitry, logic, means, or instructions for monitoring dirty information for the buffer provided by a register associated with the buffer, where the data may be communicated based at least in part on the dirty information indicating the data includes dirty data.

Some examples of the method 800 and the apparatus described herein may further include operations, features, circuitry, logic, means, or instructions for determining a first quantity of queued write commands for the non-volatile memory and a second quantity of queued read commands for the non-volatile memory, where the data may be communicated based at least in part on the first quantity of queued write commands and the second quantity of queued read commands.

Some examples of the method 800 and the apparatus described herein may further include operations, features, circuitry, logic, means, or instructions for writing second data for the row to the buffer based at least in part on a second write command, receiving, from the host device, the pre-charge command for the row of the bank, and communicating the second data from the buffer to the non-volatile memory based at least in part on the second write command and the pre-charge command.

Some examples of the method 800 and the apparatus described herein may further include operations, features, circuitry, logic, means, or instructions for writing second data for the row to the buffer based at least in part on a second write command and communicating, based at least in part on the second write command and after the pre-charge command may be received for the row of the bank, the second data from the buffer to the non-volatile memory.

It should be noted that the methods described herein describe possible implementations, and that the operations and the steps may be rearranged or otherwise modified and that other implementations are possible. Further, portions from two or more of the methods may be combined.

Another apparatus is described. The apparatus may include a non-volatile memory, a volatile memory configured to operate as cache for the non-volatile memory, an interface controller coupled with the non-volatile memory and the volatile memory, the interface controller operable to cause the apparatus to, and receive, from a host device, a write command associated with a row of a bank in the volatile memory write data associated with the write command to a buffer that is associated with the bank and that is coupled with the volatile memory, communicate the data from the buffer to the volatile memory based at least in part on the write command and before a pre-charge command for the row of the bank is received from the host device, and write the data to the row of the bank in the volatile memory after communicating the data to the volatile memory and based at least in part on the write command In some examples of the apparatus, the interface controller may be further operable to cause the apparatus to determine the data includes dirty data that may be different than corresponding data in the row, where the data may be communicated from the buffer to the volatile memory based at least in part on the data including dirty data.

In some examples of the apparatus, the interface controller may be further operable to cause the apparatus to monitor dirty information for the buffer provided by a register associated with the buffer, where the data may be communicated based at least in part on the dirty information indicating the data includes dirty data.

In some examples of the apparatus, the interface controller may be further operable to cause the apparatus to determining a first quantity of queued write commands for the volatile memory and a second quantity of queued read commands for the volatile memory, where the data may be communicated based at least in part on the first quantity of queued write commands and the second quantity of queued read commands.

Another apparatus is described. The apparatus may include a non-volatile memory, a volatile memory configured to operate as cache for the non-volatile memory, and an interface controller coupled with the non-volatile memory and the volatile memory, the interface controller operable to cause the apparatus to receive a write command for data from a row of a bank in the volatile memory, write, based at least in part on the write command, the data from the row of the bank to a buffer coupled with the volatile memory and the non-volatile memory, communicate the data from the buffer to the non-volatile memory based at least in part on the write command and before a pre-charge command for the row of the bank is received, and write the data to the non-volatile memory after communicating the data to the non-volatile memory and based at least in part on the write command In some examples of the apparatus, the interface controller may be further operable to cause the apparatus to determine the data includes dirty data that may be different than corresponding data in the non-volatile memory, where the data may be communicated from the buffer to the non-volatile memory based at least in part on the data including dirty data.

In some examples of the apparatus, the interface controller may be further operable to cause the apparatus to monitor dirty information for the buffer provided by a register associated with the buffer, where the data may be communicated based at least in part on the dirty information indicating the data includes dirty data.

In some examples of the apparatus, the interface controller may be further operable to cause the apparatus to determine a first quantity of queued write commands for the non-volatile memory and a second quantity of queued read commands for the non-volatile memory, where the data may be communicated based at least in part on the first quantity of queued write commands and the second quantity of queued read commands.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

It should be noted that the methods described above describe possible implementations, and that the operations and the steps may be rearranged or otherwise modified and that other implementations are possible. Furthermore, portions from two or more of the methods may be combined.

If used to describe a conditional action or process, the terms "if," "when," "based on," "based at least in part on," and "in response to," may be interchangeable.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a non-volatile memory;
a volatile memory configured to operate as cache for the non-volatile memory; and
an interface controller coupled with the non-volatile memory and the volatile memory, the interface controller operable to cause the apparatus to:
receive, from a host device, a write command associated with a row of a bank in the volatile memory;
write data associated with the write command to a buffer that is associated with the bank and that is coupled with the volatile memory;
communicate, by the interface controller, the data from the buffer to the volatile memory based at least in part on the write command and before a pre-charge command associated with the data is received, by the interface controller from the host device, for the row of the bank; and
write the data to the row of the bank in the volatile memory after communicating the data to the volatile memory and based at least in part on the write command.

2. The apparatus of claim 1, wherein the interface controller is further operable to cause the apparatus to:
determine the data comprises dirty data that is different than corresponding data in the row, wherein the data is communicated from the buffer to the volatile memory based at least in part on the data comprising dirty data.

3. The apparatus of claim 1, wherein the interface controller is further operable to cause the apparatus to:
monitor dirty information for the buffer provided by a register associated with the buffer, wherein the data is communicated based at least in part on the dirty information indicating the data comprises dirty data.

4. The apparatus of claim 1, wherein the interface controller is further operable to cause the apparatus to:
determine a first quantity of queued write commands for the volatile memory and a second quantity of queued read commands for the volatile memory, wherein the data is communicated based at least in part on the first quantity of queued write commands and the second quantity of queued read commands.

5. The apparatus of claim 1, wherein the interface controller is further operable to cause the apparatus to:
write second data for the row to the buffer based at least in part on a second write command; and
communicate, based at least in part on the second write command and before the pre-charge command is received for the row of the bank, the second data from the buffer to the volatile memory.

6. The apparatus of claim 1, wherein the interface controller is further operable to cause the apparatus to:
write second data for the row to the buffer based at least in part on a second write command;
receive, from the host device, the pre-charge command for the row of the bank; and
communicate the second data from the buffer to the volatile memory based at least in part on the second write command and the pre-charge command.

7. The apparatus of claim 1, wherein the interface controller is further operable to cause the apparatus to:
determine, based at least in part on the write command, the row of the bank is storing second data;
store, based at least in part on the determination, the second data in a second buffer coupled with the volatile memory and the non-volatile memory; and
communicate the second data to the non-volatile memory before the pre-charge command for the bank is received.

8. An apparatus, comprising:
a non-volatile memory;
a volatile memory configured to operate as cache for the non-volatile memory; and
an interface controller coupled with the non-volatile memory and the volatile memory, the interface controller operable to cause the apparatus to:
receive a write command for data from a row of a bank in the volatile memory;
write, based at least in part on the write command, the data from the row of the bank to a buffer coupled with the volatile memory and the non-volatile memory;
communicate the data from the buffer to the non-volatile memory based at least in part on the write command and before a pre-charge command for the row of the bank is received from a host device; and
write the data to the non-volatile memory after communicating the data to the non-volatile memory and based at least in part on the write command.

9. The apparatus of claim 8, wherein the write command is associated with an eviction procedure for saving the data from the row of the bank in the volatile memory to the non-volatile memory.

10. The apparatus of claim 8, wherein the interface controller is further operable to cause the apparatus to:
determine the data comprises dirty data that is different than corresponding data in the non-volatile memory, wherein the data is communicated from the buffer to the non-volatile memory based at least in part on the data comprising dirty data.

11. The apparatus of claim 8, wherein the interface controller is further operable to cause the apparatus to:
monitor dirty information for the buffer provided by a register associated with the buffer, wherein the data is communicated based at least in part on the dirty information indicating the data comprises dirty data.

12. The apparatus of claim 8, wherein the interface controller is further operable to cause the apparatus to:
determine a first quantity of queued write commands for the non-volatile memory and a second quantity of queued read commands for the non-volatile memory, wherein the data is communicated based at least in part on the first quantity of queued write commands and the second quantity of queued read commands.

13. The apparatus of claim 8, wherein the interface controller is further operable to cause the apparatus to:
write second data for the row to the buffer based at least in part on a second write command;
receive, from the host device, the pre-charge command for the row of the bank; and
communicate the second data from the buffer to the non-volatile memory based at least in part on the second write command and the pre-charge command.

14. The apparatus of claim 8, wherein the interface controller is further operable to cause the apparatus to:
write second data for the row to the buffer based at least in part on a second write command; and
communicate, based at least in part on the second write command and after the pre-charge command is received for the row of the bank, the second data from the buffer to the non-volatile memory.

15. A method at a memory device, comprising:

receiving, from a host device, a write command associated with a row of a bank in a volatile memory, the volatile memory operated as a cache for a non-volatile memory;

writing data associated with the write command to a buffer that is associated with the bank and that is coupled with the volatile memory; and communicating, by the memory device, the data from the buffer to the volatile memory based at least in part on the write command and before a pre-charge command associated with the data is received, by the memory device from the host device, for the row of the bank.

16. The method of claim 15, further comprising:

writing the data to the row of the bank in the volatile memory based at least in part on the write command and after communicating the data to the volatile memory.

17. The method of claim 15, further comprising:

determining the data comprises dirty data that is different than corresponding data in the row, wherein the data is communicated from the buffer to the volatile memory based at least in part on the data comprising dirty data.

18. The method of claim 15, further comprising:

monitoring dirty information for the buffer, the dirty information in a register associated with the buffer, wherein the data is communicated based at least in part on the dirty information indicating the data comprises dirty data.

19. The method of claim 15, further comprising:

determining a first quantity of queued write commands for the volatile memory and a second quantity of queued read commands for the volatile memory, wherein the data is communicated based at least in part on the first quantity of queued write commands and the second quantity of queued read commands.

20. The method of claim 15, further comprising:

writing second data for the row to the buffer based at least in part on a second write command; and communicating, based at least in part on the second write command and before the pre-charge command is received for the row of the bank, second data from the buffer to the volatile memory.

21. A method at a memory device, comprising:

receiving a write command for data from a row of a bank in a volatile memory, the volatile memory operated as a cache for a non-volatile memory;

writing, based at least in part on the write command, the data from the row of the bank to a buffer coupled with the volatile memory and the non-volatile memory; and communicating the data from the buffer to the non-volatile memory based at least in part on the write command and before a pre-charge command for the row of the bank is received from a host device.

22. The method of claim 21, further comprising:

writing the data to the non-volatile memory based at least in part on the write command and after communicating the data to the volatile memory.

23. The method of claim 21, further comprising:

determining the data comprises dirty data that is different than corresponding data in the non-volatile memory, wherein the data is communicated from the buffer to the non-volatile memory based at least in part on the data comprising dirty data.

24. The method of claim 21, further comprising:

monitoring dirty information for the buffer provided by a register associated with the buffer, wherein the data is communicated based at least in part on the dirty information indicating the data comprises dirty data.

* * * * *